United States Patent

[11] 3,598,458

| | | | |
|---|---|---|---|
| [72] | Inventor | Marvin Evans<br>8550 N. Fielding Road, Bayside, Wis. 53217 | |
| [21] | Appl. No. | 771,007 | |
| [22] | Filed | Oct. 28, 1968 | |
| [45] | Patented | Aug. 10, 1971 | |

[54] A CRANKSHAFT HAVING A HARDENED BEARING SURFACE
3 Claims, 3 Drawing Figs.

[52] U.S. Cl. .................................................. 308/167, 308/179
[51] Int. Cl. .................................................. F16c 3/06, F16c 9/04
[50] Field of Search .................................................. 308/23, 167, 179

[56] References Cited
UNITED STATES PATENTS
2,800,809   7/1957   Pike .............................. 308/179 X

*Primary Examiner*—Martin P. Schwardron
*Assistant Examiner*—Irwin C. Cohen
*Attorney*—Andrus, Sceales, Starke & Sawall

ABSTRACT: A crankshaft having a hardened bearing surface formed, by inductively heating a cylindrical surface of the shaft and thereafter quenching the surface to harden the same Either before or after hardening, a groove is machined within the cylindrical surface in a manner such that the base of the groove as well as the sides or thrust faces of the groove are located in the hardened zone.

PATENTED AUG 10 1971 3,598,458

INVENTOR.
Marvin Evans

BY
*Andrus, Sceales, Starke & Sawall*

Attorneys

A CRANKSHAFT HAVING A HARDENED BEARING SURFACE

This invention relates to a crankshaft having hardened bearing surface.

A crankshaft comprises a series of main bearings and pin bearings in tandem relation with adjacent bearings being offset and joined together by cheeks. The surfaces of the cheeks blend into the bearings through curved surfaces or fillets.

It has been common practice in the prior art to harden the bearing surfaces of crankshafts by induction or flame hardening techniques. In some cases only the cylindrical bearing surface is hardened and the cheeks or thrust faces are not hardened. However, during service the ends of the bearings wear against the cheeks unless the cheeks are also hardened undue wear and failure of the crankshaft may result.

The surface hardening in the fillet area connecting the bearing surface and the cheeks has created problems in the past. While the surface hardening increases the hardness and strength of the fillet area, it also reduces its ductility so that if the fillet area is stressed sufficiently high the metal may crack in the area of the fillets and these cracks can serve as stress concentration points in the crankshaft when it is subsequently subjected to working forces and may cause an early failure of the crankshaft.

A further problem encountered in the past when attempting to surface harden the fillet area, is that the hardened zone is enlarged and penetrates radially inward toward the center of the shaft, resulting in overhardening and embrittlement of the shaft. This overpenetration of heating which occurs when attempting to inductively heat both the bearing surface and the fillet area often causes distortion of the crankshaft from its original configuration, thereby requiring straightening. With the hardened area penetrating deeply into the bearing area, the bending forces to which the crankshaft is subjected in a straightening operation may produce hairline cracks in the crankshaft causing rejection of the part.

The present invention is directed to a crankshaft having a hardened bearing surface formed by initially inductively heating the cylindrical surface and thereafter quenching the surface to harden the same. Either before or after hardening, a groove is machined in the cylindrical surface in a manner such that the base of the groove as well as the thrust faces bordering the groove are in the hardened zone.

As the thrust faces as well as the cylindrical bearing surface are hardened, the roller bearings can have a longer length and the hardened thrust faces will resist wear caused by frictional contact between the ends of the bearings and the thrust faces.

The machined bearing groove eliminates the need for auxiliary bearing races or retainers. No retainers are required between the individual needle bearings and no rollers or retainers are necessary at the ends of the bearings due to the fact that the thrust faces are hardened. Therefore, a greater number of needle bearings can be used in the bearing assembly, thereby increasing the load capacity of the bearing assembly.

As the bearing groove is machined into the cylindrical surface, the depth of penetration of the induction heating is reduced and limited to the cylindrical portion of the bearing and this tends to prevent warpage of the crankshaft and thereby minimizes subsequent straightening operations.

The method of providing the hardened bearing surface of the invention is substantially less expensive than conventional processes using carburizing and hardening. In the conventional carburizing and hardening processes, the grooves are initially roughly machined into the part and the entire part is then coated with copper. Subsequently, the copper is removed from the areas to be hardened and the part is then carburized and hardened and subsequently straightened. By using the induction heating and machining the bearing groove, the copper coating and carburizing operations are eliminated.

Other objects and advantages will appear in the course of the following description.

The drawings illustrate the best mode presently contemplated of carrying out the invention.

Figure 1:
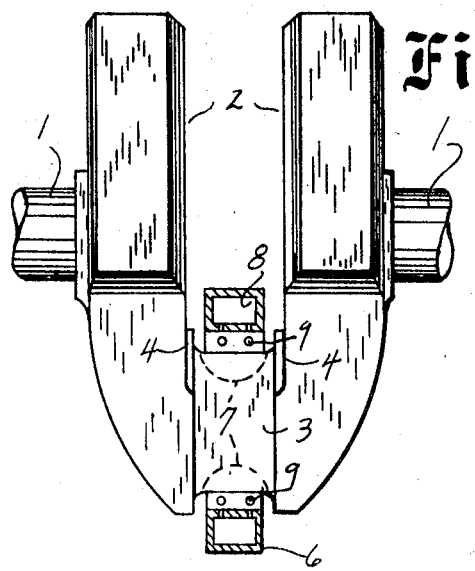
FIG. 1 is a fragmentary side elevation of a portion of a crankshaft with an induction heating coil disposed around the bearing surface to be hardened.
Figure 2:
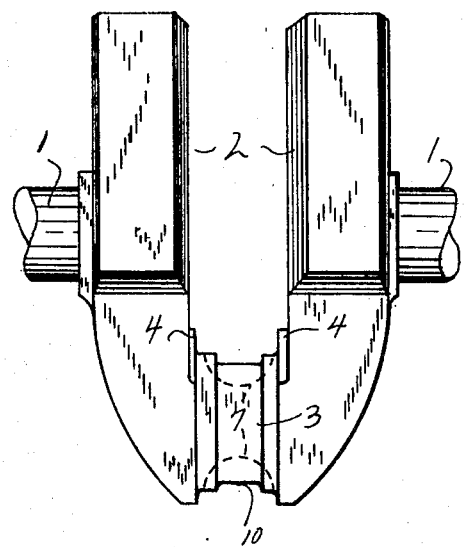
FIG. 2 is a view similar to FIG. 1, showing the hardened surface after machining of the bearing groove.

The drawings illustrate a conventional crankshaft which includes a pair of main bearings 1, connected to a pair of cheeks 2 by a bearing pin 3. The surfaces of the cheeks 2 are provided with shoulders 4 and the shoulders blend into the bearing 3 by rounded corners or fillets 5. The crankshaft itself is a conventional type and can have a series of additional pin bearings, main bearings and cheeks as required to fit the particular engine for which it is designed.

The crankshaft is fabricated from a metal or alloy which is capable of being surface quench hardened. In this treatment, the metal is heated above the critical temperature and then rapidly cooled or quenched to provide an increase in surface hardness for the metal. Carbon steel, such as AISI C1050 can be used for the crankshaft.

In accordance with the invention, the bearing 3 is heated by a high frequency induction coil 6. The coil 6, in itself, is of conventional construction and forms no part of the invention. The coil 6 has an axial length slightly less than the length of the bearing 3 and is spaced outwardly of the bearing while the ends of the coil are spaced from the shoulders 4. The coil 6 can either be formed in two pieces or can be formed of two hinged members so that it can be placed around the bearing 3 and subsequently removed. The coil 6 is energized from a suitable source of high frequency electric current and the high density current is induced to flow on the surface of the bearing 3 and heat the surface rapidly above the critical quench hardening temperature. As shown in the drawings, the heating zone defined by the dashed line 7 is generally arcuate in shape with the central portion of the heating zone penetrating radially inward toward the center of the bearing 3, and the ends of the heating zone having a lesser penetration than the central portion.

After the surface of the bearing 3 has been heated to the desired elevated temperature, the power is turned off and a quenching liquid is introduced into the internal passage 8 of the coil 6 and the liquid is discharged through the openings or nozzles 9 against the heated bearing 3. The liquid serves to rapidly quench the surface to effect the desired hardness in the area defined by the dashed line 7.

Figure 3:
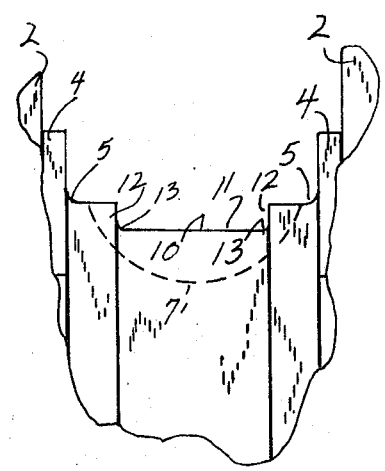
FIG. 3 is a fragmentary enlarged view similar to FIG. 2 showing the machined groove in the hardened zone.

After quenching, a groove 10 is machined in the bearing surface 3 and groove 10 includes a cylindrical base portion 11 and a pair of thrust faces 12 on opposite sides of the base. The base and thrust faces are connected together by rounded corners or fillets 13. As best shown in FIG. 3, both the cylindrical base surface 11 and thrust faces 12 are located in the hardened zone, defined by the dashed line 7, so that both function as hardened bearing surfaces. As the thrust faces 12 are hardened, the ends of the roller or needle bearings can ride against the thrust faces without causing undue wear.

While the above description has described the groove 10 machined in the baring surface after hardening, it is contemplated that in some cases the groove can be machined prior to hardening or the groove can be partially machined prior to hardening and completely machined after hardening. The hardened zone produced by the method of the invention is relatively shallow in comparison to prior art methods and this results in a minimum of distortion and a corresponding decrease in subsequent straightening.

While the invention has been described as being applied to forming a hardened bearing surface for a crankshaft, the invention can also be applied to forming a bearing surface on any other shaft or rotating member. However, the invention has particular application for high-speed engines which employ needle or roller bearings, such as two-cycle engines.

Various modes of carrying out the invention are contemplated as being within the scope of the following claims particularly pointing out and distinctly claiming the subject matter which is regarded as the invention.

I Claim:

1. A crankshaft, comprising a pair of spaced cheeks, a cylindrical bearing member disposed between the cheeks, and an annular shoulder disposed at the junction between the bearing member and each cheek, said bearing member having a circumferential groove with the sides of the grooves spaced longitudinally from the corresponding shoulders, said bearing member having a surface hardened zone encompassing the base and sides of said groove, said hardened zone terminating radially short of the axis of said bearing member and terminating axially short of said shoulders whereby the junctions between the shoulders and the bearing member are outside of said hardened zone.

2. The crankshaft of claim 1, wherein the hardened zone is generally semicircular in cross section and the lateral extremities of the hardened zone terminate between the shoulders and the sides of the groove.

3. A crankshaft, comprising a pair of spaced cheeks; and a cylindrical bearing member disposed between the cheeks, said bearing member including an annular bearing surface, a first shoulder located on either side of said bearing surface, each first shoulder including a first radial surface and a first axial surface, a first fillet joining the bearing surface and each first radial surface, a second shoulder located outwardly adjacent each first shoulder, each second shoulder including a second radial surface and a second axial surface, a second fillet joining each second radial surface with the corresponding first axial surface, said bearing member having a surface hardened zone encompassing said bearing surface, said first fillets and said first radial surfaces and said hardened zone terminating axially short of said second fillets whereby said second fillets are not hardened.